United States Patent
Ajodha et al.

(10) Patent No.: US 12,137,138 B2
(45) Date of Patent: *Nov. 5, 2024

(54) AUTOMATIC APPLICATION SCALING BETWEEN PRIVATE AND PUBLIC CLOUD PLATFORMS

(71) Applicant: Microsoft Technology Licensing, LLC, Redmond, WA (US)

(72) Inventors: Anjay Vijendra Ajodha, Bellevue, WA (US); Heath Lawson, Seattle, WA (US); David James Armour, Bellevue, WA (US); Scott Michael Napolitan, Bellevue, WA (US); Matthew Joel McGlynn, Bellevue, WA (US); Shriram Natarajan, Kirkland, WA (US); Ricardo Luiz Fagundes Mendes, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/532,872

(22) Filed: Dec. 7, 2023

(65) Prior Publication Data

US 2024/0106885 A1    Mar. 28, 2024

Related U.S. Application Data

(63) Continuation of application No. 17/349,384, filed on Jun. 16, 2021, now Pat. No. 11,888,926, which is a
(Continued)

(51) Int. Cl.
 *H04L 67/1001* (2022.01)
 *H04L 67/1097* (2022.01)
 *H04L 67/60* (2022.01)

(52) U.S. Cl.
 CPC ...... *H04L 67/1001* (2022.05); *H04L 67/1097* (2013.01); *H04L 67/60* (2022.05)

(58) Field of Classification Search
 CPC .. H04L 67/1001; H04L 67/60; H04L 67/1097
 See application file for complete search history.

(56) References Cited

U.S. PATENT DOCUMENTS 8,495,611 B2 * 7/2013 McCarthy ................. G06F 8/61
                                                       709/224
11,032,369 B1 * 6/2021 Wei ..................... H04L 61/5007
(Continued)

*Primary Examiner* — Moustafa M Meky
*Assistant Examiner* — Kidest Mendaye
(74) *Attorney, Agent, or Firm* — Workman Nydegger

(57) ABSTRACT

Methods, systems, and computer program products are provided that automatically scale an application between private and public cloud computing platforms, while simultaneous enforcing policies ensuring private data is persistently stored on the private cloud computing platform, but not the public cloud computing platform. A traffic manager on the public platform routes traffic to instances of a web app executing on a private platform. A traffic monitor on the private platform monitors performance criteria of the private platform, and reports traffic telemetry to the traffic manager. Based on the traffic telemetry, the traffic manager may instantiate one or more instances of the web app on the public platform to handle traffic. Private data gathered by such instantiated instance(s) is persisted to storage in the private platform, but not in the public platform.

20 Claims, 6 Drawing Sheets

Related U.S. Application Data continuation of application No. 16/104,055, filed on Aug. 16, 2018, now Pat. No. 11,070,613.

(56) References Cited

U.S. PATENT DOCUMENTS

| | | | |
|---|---|---|---|
| 2016/0055023 A1* | 2/2016 | Ghosh | G06F 9/45558 718/1 |
| 2016/0119202 A1* | 4/2016 | Iyer | G06F 11/0751 709/224 |
| 2017/0104755 A1* | 4/2017 | Arregoces | H04L 67/10 |
| 2017/0264493 A1* | 9/2017 | Cencini | H04L 67/12 |
| 2018/0173556 A1* | 6/2018 | Ghosh | G06F 9/5077 |
| 2019/0179725 A1* | 6/2019 | Mital | H04L 43/08 |

* cited by examiner

400

Automatically scale a number of instances of an application at the public-network-accessible server set based at least in part on traffic telemetry — 402

Maintain data as data-in-use without saving the data to persistent storage while in the public-network-accessible server set. — 502

FIG. 5

AUTOMATIC APPLICATION SCALING BETWEEN PRIVATE AND PUBLIC CLOUD PLATFORMS

CROSS-REFERENCE TO RELATED APPLICATIONS

This application is a continuation of U.S. patent application Ser. No. 17/349,384, filed on Jun. 16, 2021, and entitled "AUTOMATIC APPLICATION SCALING BETWEEN PRIVATE AND PUBLIC CLOUD PLATFORMS", which is a continuation of U.S. patent application Ser. No. 16/104,055 (U.S. Pat. No. 11,070,613), filed on Aug. 16, 2018, and entitled "AUTOMATIC APPLICATION SCALING BETWEEN PRIVATE AND PUBLIC CLOUD PLATFORMS", the entirety of which are incorporated herein by reference for all purposes.

BACKGROUND

Cloud service providers typically offer many types of cloud services including the hosting of web applications, data storage, virtualization, and hosting of essentially any information technology solution. Cloud-based hosting platforms typically consist of inter-networked computer systems or servers, each of which may comprise a number of virtual machines. Cloud-based services are particularly attractive to companies that have seasonal or otherwise variable compute needs because the number of servers, virtual machines or storage and other resources may be scaled up or down to handle the variable load. Such scaling may be performed either manually, or logic may be applied to determine whether compute instances should be spun up or shut down.

Auto-scaling of compute resources dedicated to web applications is typically performed in in the context of a public cloud provider and platform where needed compute resources and storage are essentially rented from the cloud provider and are located off the premises of the cloud services consumer using the resources. In other cases, however, cloud platform implementations exist that are privately maintained and managed, and that reside entirely on-premises of the cloud services consumer. Such implementations may be beneficial where the consumer makes use of or otherwise handles private or regulated data. In such instances, it may not be permissible to store such data in the public cloud, which necessitates the need for private storage. A downside of the private, on-premises configuration is that the cloud services consumer is required to source and procure all the hardware needed to meet maximum demand even when demand may be substantially decreased at certain times of year.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided that address issues related to automatically scaling/allocating cloud resources between a non-public cloud platform or server set, and a public-network-accessible cloud platform or server set, while simultaneous maintaining access restrictions on private data, thereby ensuring such data is only ever persistently stored on the non-public server set.

In an aspect, a public-network-accessible server set is configured to enable web application instances to receive requests from computing devices over a public communication channel. The public-network-accessible server set includes a traffic manager. The traffic manager is configured to receive traffic telemetry from a non-public server set. The traffic telemetry indicates a load on non-public server set. The non-public server set is configured to execute one or more instances of the same web application on the public-network-accessible server set. Based on the traffic telemetry, the traffic manager routes incoming requests to either the non-public server set or the public server network-accessible server set.

The public-network-accessible server set may further include a secure communication channel interface configured to couple the non-public server set and public-network-accessible server set, and permit communication of confidential/private data therebetween for subsequent access or persistence to storage of the non-public server set. In an aspect, the public-network-accessible server set may be configured to never save confidential/regulated data to persistent storage in the public-network-accessible server set.

The traffic manager may be further configured to instantiate and execute the web application instance at the public-network-accessible server set based on an exhaustion of resources at the non-public server set as indicated by the traffic telemetry. The traffic manager may be further configured to automatically scale the number of web application instances executing at the public-network-accessible server set based on demand as indicated by the traffic telemetry. In another embodiment, the traffic manager may be configured to anticipate a coming increase in traffic, and in response, preemptively increase the number of web application instances executing at the public-network accessible server set to handle the anticipated increase in incoming traffic. For instance, the traffic manager may anticipate an increase in traffic based on historical information (e.g., increase in traffic a year prior), based on upcoming events (e.g., open enrollment season, tax season), and/or based upon other factors.

Further features and advantages of the invention, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 4 shows a flowchart of a method for automatically scaling the number of web application instances in a public-network-accessible server set, according to an example embodiment.

FIG. 5 shows a flowchart of a method for processing data in a public-network accessible server set without storing the data in the public-network-accessible server set, according to an example embodiment.

Figure 1:
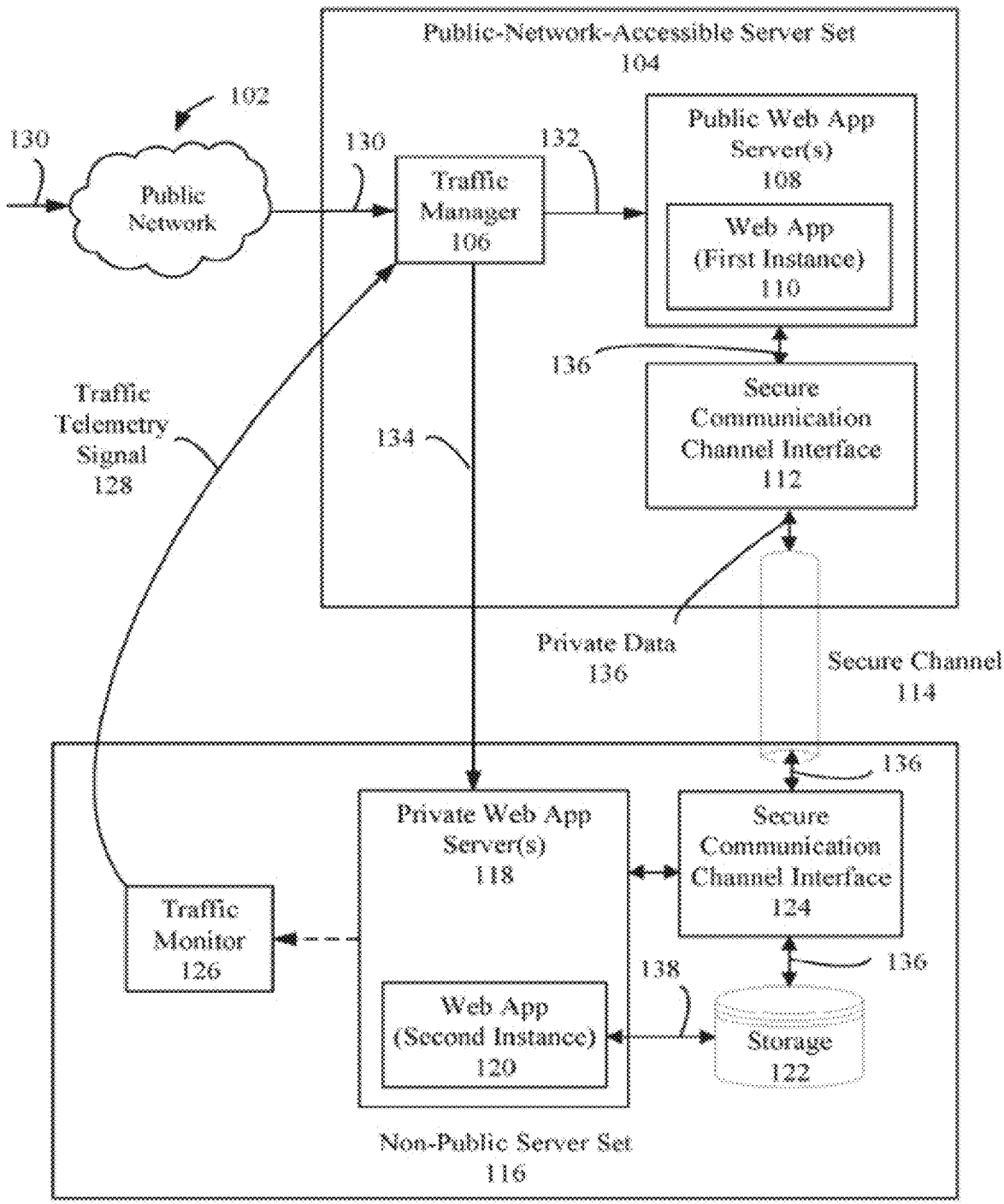
FIG. 1 shows a block diagram of a hybrid public and private computing system configured to automatically scale web applications between private and public cloud platforms, according to an example embodiment.

The features and advantages of the present invention will become more apparent from the detailed description set forth below when taken in conjunction with the drawings, in which reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Cloud computing and platform-as-a-service (PAAS) customers may have a need to keep data on-premises (e.g., at a location considered secure or private to the customer for the purposes of the data) and be able to gracefully handle what may be massive seasonal increases in traffic of accesses to the data and data storage. For example, a company may offer an annual benefits enrollment period for its employees, including health insurance benefits. The enrollment period may be relatively short, such as from 1 to 4 weeks. Enrollment or changes to employee benefit elections is typically accomplished by an employee using a benefits web application. The benefits web application may, on occasion, solicit information from the employee that is required to be held in strict confidentiality by the company, and may not be permanently housed on a public web application platform.

An employee benefits web application is just one real-world example where embodiments may be usefully deployed. Embodiments may be implemented in any type of application, including those that experience seasonal variation in demand, and in which sensitive data is stored. For example, income tax preparation and filing is a distinctly seasonal endeavor, with a substantial demand during the weeks leading up to an April filing deadline, along with the need to keep users' tax information securely within private storage. Another example is job application processing by a company immediately after announcing a substantial hiring program since employment applications often solicit sensitive information from users requiring storage off the public-cloud. Likewise, processing of student college applications may also benefit from embodiments because college application deadlines correlate to the start of an academic school year (i.e., are seasonal), and such applications normally include sensitive information. It should be understood, however, that these are but a few examples of applications that may usefully be deployed on embodiments of the invention. Any application that faces variable demand and the requirement of private cloud storage may likewise take advantage of the embodiments discussed in detail below.

To address data confidentiality requirements described above, the company may procure and administer a private cloud application platform that is housed on-premises of the company (e.g., implemented in Microsoft® Azure Stack™, in an Amazon Web Services (AWS)® hybrid cloud, in the Cisco Hybrid Cloud Platform for Google Cloud™, etc.). During most of the year, the private cloud application platform may be able to handle the web traffic generated by, for example, employees accessing the benefits web application during open enrollment. However, the open enrollment period may trigger a large increase in demand for resources of the web application platform (e.g. compute instances, virtual machines, CPU time, network bandwidth, reasonable latency, etc.). Increasing resources of the on-premises cloud application platform to satisfy such demand is not optimal given that the compute resources will be relatively idle outside the open enrollment window. Moreover, expanding the compute resources of an on-premises cloud application platform is a relatively slow process requiring the purchase and installation of additional hardware. Attempts to address traffic changes in this manner would likely be inadequate since it would be difficult or impossible to respond to increased traffic in a timely manner.

Embodiments described herein overcome these limitations by enabling a web application to be dynamically scaled while keeping private data securely stored on-premises. Furthermore, the web application is enabled to be scaled without increasing resources of the on-premises application platform. Expanding the resources of the on-premises application platform may not only be impractical, as discussed above, but the fixed compute resources of the on-premises application platform are typically more expensive than the highly expandable resources of a public cloud application platform. Accordingly, in embodiments, the web application is scaled between the private, on-premise application platform and a public application platform maintained in a network-based (e.g., cloud-based) resource platform. Any increase in resources is provided at the public application platform, which can be easily scaled up or down in the network-based resource platform based on traffic. Furthermore, data is kept private, and non-persistent, in the public application platform until being routed to the on-premise application platform, where the data is securely and persistently stored on-premises.

Accordingly, in embodiments, web application scaling is accomplished by a hybrid application platform that includes a publicly accessible (off-premises) cloud-based server set and a non-publicly accessible (on-premises) server set. The privately accessible server set is not directly routable on the public Internet. Sensitive data, including regulated data, sensitive personal data, sensitive business data, etc., is persistently stored only in the non-publicly accessible server set. In embodiments, and during times of heavy load on the hybrid application platform, on-premises platform capacity may be configured to prioritize accepting such data from the off-premises platform, and safely persisting the data to storage in the on-premises platform. At the same time, off-premises platform capacity may likewise be prioritized to handle non-storage related application functions, thereby leveraging the elastic scale of the public cloud. Such a configuration ensures not only rapid deployment of virtually unlimited compute resources as load changes, but also the ability to rapidly shrink the consumption of public compute resources when not under load. Moreover, dividing service of storage and non-storage related demands in this fashion improves the efficiency of the system as whole. For instance, the enabled rapid scaling afforded by the public cloud permits requests to be handled more quickly (i.e., by rapidly adding more application instances/virtual machines (VMs)), which likewise reduces network traffic due to fewer request failures/retries due to inadequate resources. Whether scaling up or down, the expensive fixed-capacity on-premises platform may be configured to operate at nearly full capacity thereby maximizing utilization of the capital expense.

For example, FIG. 1 shows a block diagram of a hybrid public and private computing system 100 for dynamic web application scaling, according to an embodiment. System 100 includes a public-network-accessible server set 104 and a non-public server set 116, which are communicatively coupled by a secure channel 114. Public-network-accessible server set 104 is coupled to a public network 102, and includes a traffic manager 106, one or more public web app (application) servers 108, and a secure communication channel interface 112. Public web app server(s) 108 includes a first instance 110 of a web app. Non-public server set 116 includes one or more private web application servers 118, storage 122, a secure communication channel interface 124, and a traffic monitor 126. Private web app server(s) 118 includes a second instance 120 of the web app 120. These features of system 100 are described as follows.

Public network 102 is a publicly accessible network over which any number of computing devices (not shown in FIG. 1 for brevity) can access applications of public-network-accessible server set 104, including web app first instance 110. For example, a request 130 may be received by public-network-accessible server set 104 from a computing device over public network 102. Request 130 may be received by traffic manager 106 of public-network-accessible server set 104. In an embodiment, public network 102 includes the Internet. Public network 102 may comprise one or more networks such as local area networks (LANs), wide area networks (WANs), enterprise networks, and may include one or more of wired and/or wireless portions. Examples of computing devices that may access applications at public-network-accessible server set 104 include, for example and without limitation, desktop computers, laptop computers, tablet computers, netbooks, smartphone, wearable computing devices, etc.

Although public-network-accessible server set 104 is depicted as a monolithic component, public-network-accessible server set 104 may be embodied in any number of computing devices including servers, and may include any type and number of other resources, including resources that facilitate communications with and between computing devices connected via public network 102 through traffic manager 106, or secure communication channel interface 112. In embodiments, servers implementing public web app servers 108 of public-network-accessible server set 104 may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, the servers of public web app servers 108 may be co-located (e.g., housed in one or more nearby buildings with associated components such as backup power supplies, redundant data communications, environmental controls, etc.) to form a datacenter, or may be arranged in other manners. Accordingly, in an embodiment, public web app servers 108 may comprise a datacenter in a distributed collection of datacenters. Public web app servers 108 is configured to host applications, including web applications such as web app first instance 110, and thus may implement a web site, web server, web service, and/or other transaction handling application for web app first instance 110.

Similar to public-network-accessible server set 104, although depicted as a monolithic component, non-public server set 116 may be embodied in any number of computing devices including servers, and may include any type and number of other resources, including resources that facilitate communications with and between computing devices thereof, or through secure communication channel interface 112. In embodiments, non-public web app servers 118 of non-public server set 116 include any number of servers that may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, the servers of non-public web app servers 118 may be co-located (e.g., housed in one or more nearby buildings with associated components such as backup power supplies, redundant data communications, environmental controls, etc.). Furthermore, non-public server set 116 includes private web app servers 118 and secure communication channel interface 124. Private web app servers 118 are configured to host applications, include web app second instance 120.

Web app first instance 110 and web app second instance 120 are each instances of a same web application. A web application (also known as "web app," "webapp," or just "app") is a client-server software application that runs in a web browser. A web application is implemented in the form of code that is downloaded from a server to a client computer and executed in the web browser at that client computer. The web browser functions as the client to run, update, and maintain the web application. Examples formats of web application code include standard formats such as HTML (hypertext markup language) and JavaScript, which are supported by a variety of web browsers. The client-side web application code may access the server for data, but code for a web application primarily executes in the browser. Very large numbers of web applications exist. Common types of web applications include webmail, online retail sales, online auctions, wikis, instant messaging services.

Traffic monitor 126 of non-public server set 116 is configured to monitor traffic-related conditions in non-public server set 116. Examples of such traffic-related conditions include a number of web requests, CPU load (either per virtual machine, or in the aggregate), server errors, response delay, bandwidth or latency. Server errors may include errors such as: 408 Request Timeout, 503 Service Unavailable, 504 Gateway Timeout, 598 Network read timeout error, or 599 Network connect timeout error, and the like. Response delay reflects an amount of time server set 116 takes to respond to a request. Each condition may be determined in non-public server set 116 in any suitable manner, including by a system monitor/task manager built into an operating system of one or more servers of server set 116 (e.g., to detect CPU usage/load, memory usage, disk accesses, network utilization link speed, etc.), by a network monitor, by one or more proprietary tools, and/or in any other manner. Such conditions may indicate whether web app second instance 120 is handling an amount of requests such that response times by web app second instance 120 to such requests are longer than desired, and as such, it may be desired to generate and/or utilize web app first instance 110 in public-network-accessible server set 104 to handle at least some of the requests and thereby shorten overall response times. As shown in FIG. 1, traffic monitor 126 generates a traffic telemetry signal 128, which includes traffic telemetry indicating an amount of request traffic being handled by web app second instance 120. Traffic telemetry signal 128 may include any one or more types of traffic telemetry including indications of CPU cycles of processors of private web app server(s) 118 executing web app second instance 120, a number of requests received in a predetermined time period or requests per time period, a latency of response time by web app second instance 120, network bandwidth, a number of HTTP errors (as described above), and the like.

Traffic manager 106 of public-network-accessible server set 104 is configured to receive requests over public network 102 from computing devices attempting to access the web application embodied by both of web app first instance 110 and web app second instance 120. Traffic manager 106 is configured to route the requests to one or both of public web app servers 108 and private web app servers 118, depending on operating conditions at the non-public server set 116. For example, as shown in FIG. 1, traffic manager 106 may receive traffic telemetry signal 128. Based on the traffic telemetry indicated in traffic telemetry signal 128, traffic manager 106 may route primary requests 134 to web app second instance 120, or overflow requests 132 to web app first instance.

Traffic manager 106 may make such a routing determination in any manner. In an embodiment, traffic manager 106 may compare a traffic indication received in traffic telemetry signal 128 to a predetermined threshold value, and make the routing determination based thereon. For instance, if a response latency indication received in traffic telemetry signal 128 has a latency value greater than a predetermined threshold latency (e.g., 1 millisecond), traffic manager 106 may route a request received by public-network-accessible server set 104 from a computing device over public network 102 to web app first instance 110 (thereby not burdening web app second instance 120 with the request). If the latency value is less than the predetermined threshold latency, traffic manager 106 may route the request to web app second instance 120 (due to web app second instance 120 being able to timely handle the request).

Non-public server set 116 includes storage 122 coupled to secure communication channel interface 124 and private web app servers 118. In an embodiment, storage 122 stores any data requiring security, including private data, regulated data, etc., collected by web app first and second instances 110 and 120 running on public-network-accessible server set 104 and non-public server set 116, respectively. Although depicted as a single storage component, storage 122 of non-public server set 116 may comprise one or more different storage devices that may be organized in any manner physically, logically, virtually or otherwise. Such storage devices may be comprised not only of physical storage components (e.g., hard disk drives, solid state devices (SSDs), etc.), but also associated server components configured to process storage access requests. Accordingly, in an embodiment, servers included in storage 122 may comprise and/or be co-located in a manner described above with respect to public web app servers 108.

Public-network-accessible server set 104 and non-public server set 116 include secure communication channel interfaces 112 and 124, respectively. Secure communication channel interfaces 112 and 124 are configured to securely couple public-network-accessible server set 104 and non-public server set 116, enabling secure communications between them, as discussed in greater detail below. Secure communication channel interfaces 112 and 124 communicate data through secure channel 114, which may include one or more communications links, wired and/or wireless, including a local area network, etc. Secure communication channel interfaces 112 and 124 pass encrypted data back and forth between the respective server sets. For example, public web app servers 108 of public-network-accessible server set 104 may use secure communication channel interface 112 to transfer private data 136 to non-public server set 116 to persist to storage 122. Likewise, data or web resources required for rendering web pages in public web app servers 108 may be retrieved from non-public server set 116 through secure communication channel interfaces 112 and 124 via secure channel 114.

System 100 of FIG. 1 is now further described with respect to an example embodiment. In particular, for illustrative purposes, system 100 is described as follows with respect to the benefits enrollment application mentioned above. In such an application, a web app may at times gather sensitive (e.g., regulated information, private information, etc.) from end users. For example, web application may solicit the user to provide confidential information that is subject to, for example, the Health Insurance Portability and Accountability Act ("HIPAA") data privacy and security provisions in the United States, or similar such provisions under the General Data Protection Regulation ("GDPR") of the European Union. In such instances, it may be preferable to store such data only in locations that are under the strict control of the company.

Accordingly, a company may own and/or manage non-public server set 116 to run web app second instance 120 as a benefits enrollment application to handle associated requests with respect to such private data. Non-public server set 116 running web app second instance 120 may be maintained on company grounds, for example. Further suppose that non-public server set 116 has sufficient processing and bandwidth resources to comfortably handle benefit enrollment or update requests outside of the open enrollment period, but does not have sufficient resources to handle the open enrollment period load.

As a general matter then, embodiments of system 100 of FIG. 1 operate in two operating modes to service requests made by employee end users over public network 102. In the first mode, where the company is outside of open enrollment and the processing needs of non-public server set 116 are relatively modest, service requests made by employee end users received at public-network-accessible server set 104 via public network 102 are routed by traffic manager 106 to non-public server set 116 to be processed by web app second instance 120. Web app second instance 120 running on private web app server(s) 118 may be configured to gather and store associated data directly to storage 122.

Accordingly, in the first mode, such as request 130, which are received over public network 102 in an encrypted form, are routed directly to non-public server set 116 by traffic manager 106 in primary requests 134, and are not passed to public web app server(s) 108. As such, primary requests 134 are handled in private web app server(s) 118, including storing data 138 associated with primary requests 134 in storage 122 in encrypted or decrypted form, while maintaining security/privacy of data 138 due to data 138 being persistently stored only in storage 122 related to private web app server(s) 118.

In the second mode, where the company is in the open enrollment period, and thus incoming traffic from public network 102 is considered sufficient to exceed the resources of non-public server set 116, traffic monitor 126 detects the associated exceeding of resources in non-public server set 116, and reports the resource exceeding in the form of traffic telemetry (in traffic telemetry signal 128) transmitted to traffic manager 106 of public-network-accessible server set 104. Traffic manager 106 assesses the traffic telemetry to determine the presence of excess traffic (e.g., by comparing indicated conditions to thresholds, etc.), and responds by starting (e.g., executing) one or more instances of web app first instance 110 (the web-based benefits application) on public web app servers 108 and subsequently routing at least some of the received requests to such instances. Depending on the traffic telemetry over time, traffic manager 106 may start one or more additional instances of web app first instance 110, may terminate one or more instances of web app first instance 110, and/or may modify the relative number of requests 132 and 134 routed to web app first and second instances 110 and 120.

Accordingly, in the second mode, at least some requests, such as request 130, which are received over public network 102 in an encrypted form, are routed to public-network-accessible server set 104 by traffic manager 106 in overflow requests 132, to be handled by web app first instance 110 (and potentially further instances of the web app), and some are routed to public web app server(s) 108 as primary requests 134, to be handled by web app second instance 120. Overflow requests 132 routed to public-network-accessible server set 104 are routed there to relieve a processing burden on nonpublic server set 106. Overflow requests 132 are handled by web app first instance 110 (or further instances). Web app first instance 110 may generate response data that is transmitted over public network 102 to the source of request 130, and/or may generate data for persistent storage, referred to as private data 136. Private data 136 is not persistently stored in storage in public-network-accessible server set 104. Instead, private data 136 is transmitted by secure communication channel interface 112 from public-network-accessible server set 104 over secure channel 114 to secure communication channel interface 124 in non-public server set 116, for storage in storage 122. In this manner, private data 136 is handled in a sensitive manner by being persistently stored only in storage 122 associated with private web app server(s) 118. Note that primary requests 134 routed to private web app server(s) 118 in the second mode are handled in a similar manner as described above for the first mode.

Furthermore, note that in response to a request, web app first instance 110 may retrieve private data 136 from storage 122 via secure channel 114 (e.g., in response to a request from a requester), and may transmit the retrieved data to a requester over public network 102 without having persistently stored private data 136 in public-network-accessible server set 104. The privacy/security of private data 136 is maintained by web app first instance 110 retrieving private data 136 from storage 122 over secure channel 114 (by communications between secure communication channel interfaces 112 and 124), and transmitting the retrieved data to the requester without persistently storing private data 136 in public-network-accessible server set 104.

Note that foregoing general description of the operation of system 100 is provided for illustration, and embodiments of system 100 may operate in manners and in applications different than described above. Furthermore, not all such processing steps need be performed in all embodiments.

Figure 2:
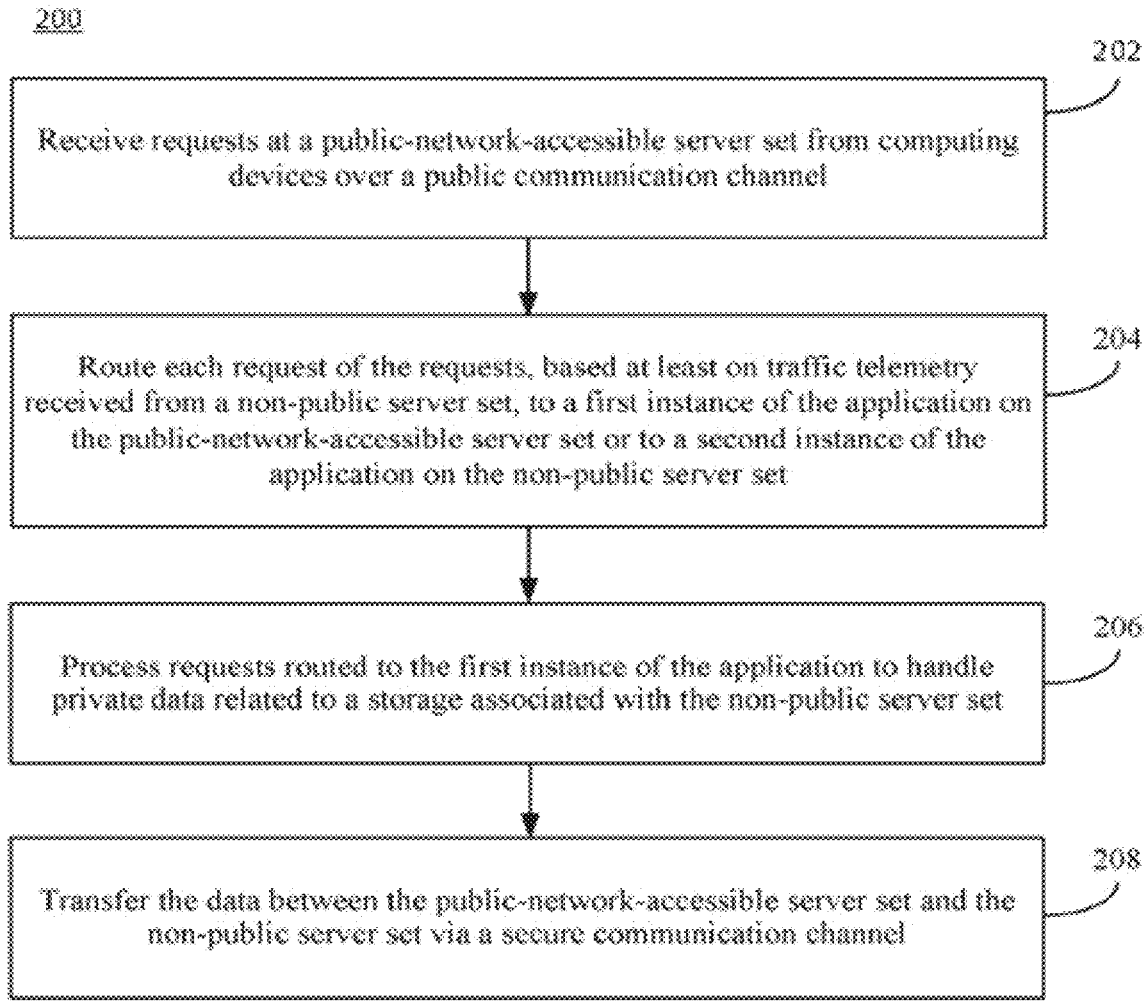
FIG. 2 shows a flowchart of a method of operating a public-network-accessible server set in a system for automatically scaling web applications between private and public cloud platforms, according to an example embodiment.

In embodiments, system 100 of FIG. 1 may be used in various ways to automatically scale cloud-based resources. For instance, FIG. 2 shows a flowchart 200 showing a process flow for the public-network-accessible server set 104 of FIG. 1, according to an embodiment. Flowchart 200 is described with continued reference to FIG. 1. However, other structural and operational embodiments will be apparent to persons skilled in the relevant art(s) based on the following discussion regarding flowchart 200 and system 100 of FIG. 1.

Flowchart 200 begins with step 202. In step 202, requests are received at a public-network-accessible server set from computing devices over a public communication channel. In an embodiment, a public-network-accessible server set such as, for example, public-network-accessible server set 104 of FIG. 1 receives requests, such as request 130, from computing devices over a public communications channel. More particularly, and in the context of system 100 of FIG. 1, traffic manager 106 may receive requests from computing devices connected via public network 102.

In step 204, each request of the requests is routed, based at least on traffic telemetry received from a non-public server set, to a first instance of the application on the public-network-accessible server set or to a second instance of the application on the non-public server set. For example, traffic manager 106 of public-network-accessible server set 104 may route the received requests to a first instance of a web application on the public-network-accessible server set 104, or to a second instance of the web application on the non-public server set 116. Routing may be performed by traffic manager 106 based at least on traffic telemetry generated by and received from traffic monitor 126 at non-public server set 116.

For example, and with respect to the example employee benefits web application discussed above, traffic manager 106 may receive traffic telemetry in traffic telemetry signal 128 from traffic manager 106. Traffic manager 106 may determine, based on the traffic telemetry, that non-public server set 116 (as well as private web app servers 118 running therein) has sufficient compute, memory and/or network resources to continue processing incoming requests in a timely manner. Accordingly, traffic manager 106 routes received requests to non-public server set 116 for processing by web app second instance 120.

On the other hand, traffic manager 106 may determine based at least in part on the received traffic telemetry that non-public server set 116 (as well as private web app servers 118 running therein) does not have enough resources to handle requests in a timely fashion. In response to such determination, traffic manager 106 routes requests to public web app servers 108 in public-network-accessible server set 104 for processing by web app first instance 110 (and may optionally have to instantiate web app first instance 110, and/or further instances thereof, if not already executing).

Note that traffic manager 106 may make the routing determination at any suitable time and/or frequency, including each time a request is received, each time a predetermined number of requests is received (e.g., after receiving 5 requests, 10 requests, 100 requests, etc.), at a predetermined time/date, on a predetermined schedule (e.g., at the beginning of each hour, once per day, etc.), etc.

Flowchart 200 continues at step 206. At step 206, requests routed to the first instance of the application are processed to handle private data related to a storage associated with the non-public server set. In an embodiment, such storage may be storage 122 of non-public server set 116 of FIG. 1. Data may be handled by web app first instance 110 in a number of ways. For example, data may be sent to (as shown in step 208) or requested from non-public server set 116 for processing by web app first instance 110 through secure communication channel interfaces 112 and 114.

In step 208, the data is transferred between the public-network-accessible server set and the non-public server set via a secure communication channel. In one embodiment, the public-network-accessible server set and non-public server set may comprise public-network-accessible server set 104 or 116, respectively, and the secure communication channel may comprise secure channel 114 as shown in FIG. 1. As described above, data may be transmitted from web app first instance 110 in public-network-accessible server set 104 to non-public server set 116 through secure channel 114. In another embodiment, data may be transmitted from non-public server set 116 (e.g., from storage 122 therein) to be processed at web app first instance 110 in public-network-accessible server set 104.

In the foregoing discussion of steps 202-208 of flowchart 200, it should also be understood that at times, such steps may be performed in a different order or even contemporaneously with other steps. For example, in embodiments, the steps of flowchart 200 may be being performed by multiple web app instances on public web app servers 108 or private web app servers 118.

Figure 3:
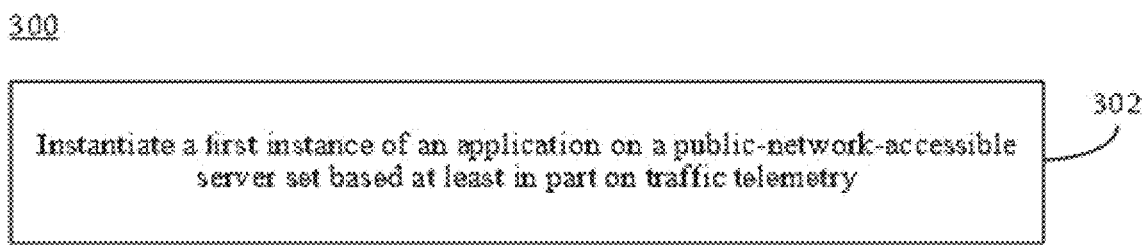
FIG. 3 shows a flowchart of a method of instantiating web application instances in a public-network-accessible server set, according to an example embodiment.

As noted above, traffic manager 106 may instantiate web app first instance 110 in public-network-accessible server set 104 during high traffic periods for web app second instance 120. For example, traffic manager 106 of public-network-accessible server set 104 may further operate according to FIG. 3. FIG. 3 depicts a flowchart 300 showing an example method of instantiating web application instances in a public-network-accessible server set, according to an embodiment. Flowchart 300 is described with reference to system 100 of FIG. 1, although the method is not limited to that implementation. Other structural and operational embodiments will be apparent to persons skilled in the relevant art(s) based on the following discussion regarding flowchart 300.

In step 302 of flowchart 300, a first instance of an application is instantiated on a public-network-accessible server set based at least in part on traffic telemetry. For example, traffic manager 106 of public-network-accessible server set 104 may be configured to receive traffic telemetry from traffic monitor 126 of non-public server set 116. Based at least in part on that traffic telemetry, traffic manager 106 may cause a first instance of web app second instance 120 to be instantiated on public-network-accessible server set 104 as web app second instance 120. In the context of the employee benefits enrollment web application discussed above, traffic manager 106 of public-network-accessible server set 104 could instantiate web app first instance 110 when the non-public server set 116 is no longer capable of handling the incoming traffic on its own, as discussed in embodiments above.

It is noted that additional web app instances may be instantiated in the event a single web app instance in public-network-accessible server set 104 is not enough. For instance, in an embodiment, traffic manager 106 of public-network-accessible server set 104 may operate according to FIG. 4. FIG. 4 shows a flowchart 400 of an example method for automatically scaling the number of web application instances in a public-network-accessible server set, according to an example embodiment. Flowchart 400 is described with reference to system 100 of FIG. 1, although the method is not limited to that implementation. Other structural and operational embodiments will be apparent to persons skilled in the relevant art(s) based on the following discussion regarding flowchart 400.

In step 402 of flowchart 400, a number of instances of the application at the public-network-accessible server set is automatically scaled based at least in part on traffic telemetry. In an embodiment, traffic manager 106 may add/instantiate or terminate instances of web app second instance 120 to meet desired performance criteria as indicated or dictated by, for example, traffic telemetry indicated in traffic telemetry signal 128 provided to traffic manager 106 by traffic monitor 126. For example, when traffic manager 106 determines an increase in the number of requests 130, which may lead to memory, processor, and/or network resources becoming too constrained to process additional requests, traffic manager 106 may include an indication of this determination in traffic telemetry signal 128. In response, traffic manager 106 may scale up processing power by starting additional web app instances at the public-network-accessible server set. Likewise, the number of requests 130 received by traffic manager 106 may decrease over time (e.g., the number of requests may fall below a predetermined threshold number per unit time). As a result, some web application instances at the public-network-accessible server set may process requests at a relatively low rate, even going idle in some cases. Traffic manager 106 may be configured to respond by scaling down processing power by terminating and/or deleting web application instances. Such scaling down behavior may be desirable because accrued charges associated with use of a public cloud platform may depend on the amount of allocated resources.

As discussed above, in certain cases it may be beneficial or necessary to prevent private data from being stored by third-party cloud services providers and/or in locations accessible from the public Internet. As such, embodiments may operate according to FIG. 5. FIG. 5 shows a flowchart 500 of an example method for processing data in a public-network-accessible server set without storing the data in the public-network-accessible server set, according to an embodiment. Flowchart 500 is described with reference to system 100 of FIG. 1, although the method is not limited to that implementation. Other structural and operational embodiments will be apparent to persons skilled in the relevant art(s) based on the following discussion regarding flowchart 500.

In step 502 of flowchart 500, data is maintained as data-in-use without saving the data to persistent storage while in the public-network-accessible server set. In embodiments, public-network-accessible server set 104 of system 100 maintains private data as data-in-use, without saving the private data to persistent storage in public-network-accessible server set 104. It is understood that a certain amount of buffering, processing registers, and the like may be associated with temporarily holding such private data while being processed and transported within public-network-accessible server set. However, this type of handling of private data is transient, not persistent, because the private data is not stored in persistent storage in public-network-accessible server set 104. The private data is only stored persistently in storage 122 of non-public server set 116 (e.g., stored in long-term storage, such as hard disk drives of storage 122).

Figure 6:
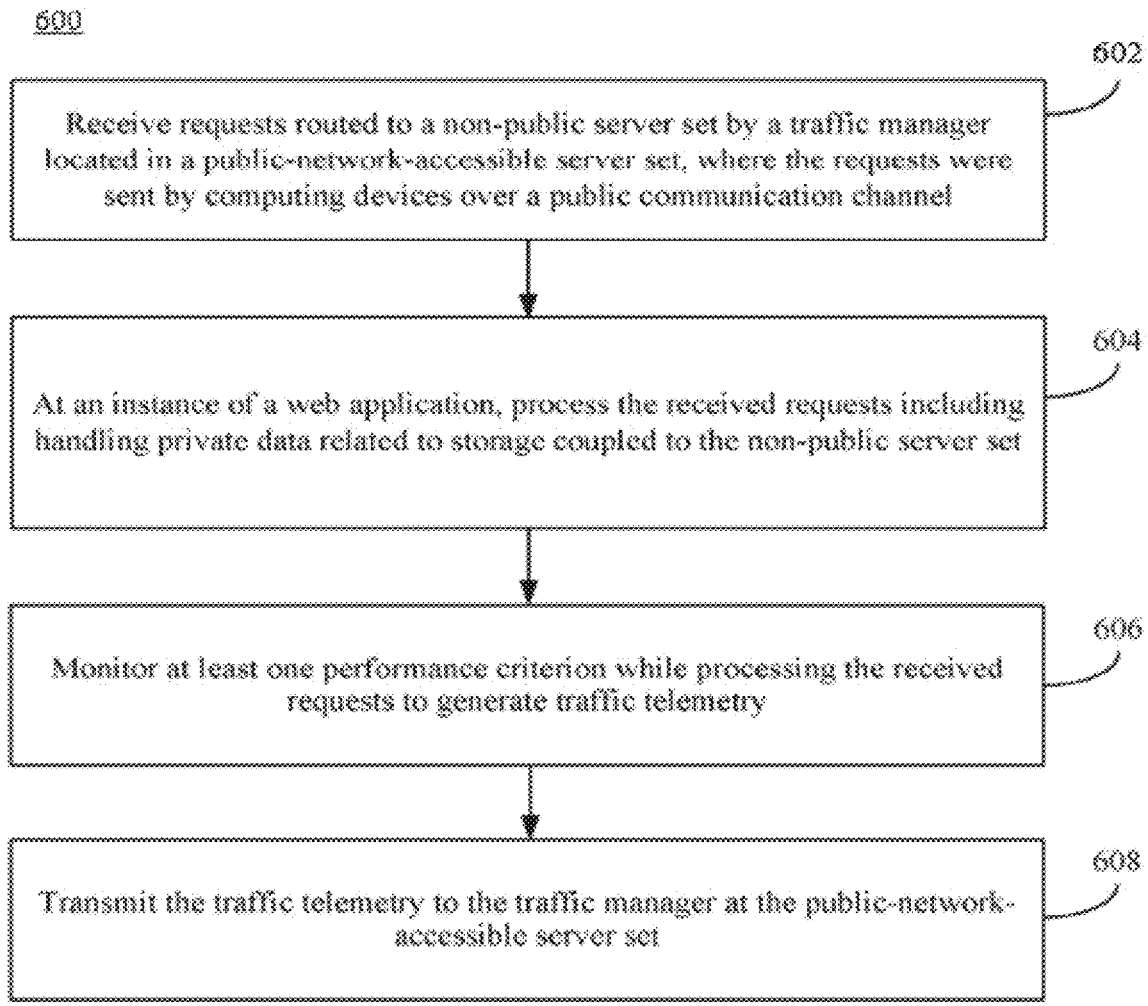
FIG. 6 shows a flowchart of a method in a non-public server set for handling web app requests and monitoring web app traffic, according to an example embodiment.

As discussed above, system 100 of FIG. 1 may scale up and down additional instances of a web app in order to manage an overall load of requests to the web app. Flowchart 200 of FIG. 2 is directed to the public side of system 100, in particular being directed to public-network-accessible server set 104. Embodiments are also directed to the private/non-public side of system 100. For instance, FIG. 6 shows a flowchart 600 of a method in non-public server set 116 for handling web app requests and monitoring web app traffic, according to an embodiment. Flowchart 600 is described with continued reference to FIG. 1. However, other structural and operational embodiments will be apparent to persons skilled in the relevant art(s) based on the following discussion regarding flowchart 600 and system 100 of FIG. 1.

Flowchart 600 begins in step 602. In step 602, a non-public server set receives requests routed thereto by a traffic manager located in a public-network-accessible server set, where the requests were sent by computing devices over a public communication channel. For example, as shown in FIG. 1, non-public server set 116 receives requests 134 at web app second instance 120 executing on private web app servers 118. Requests 134 were routed to non-public server set 116 by traffic manager 106 of public-network-accessible server set 104. As further described above, requests 134 were received by traffic manager 106 as requests 130, which were sent to public-network-accessible server set 104 by computing devices over a public communication channel such as, for example, public network 102.

In step 604, the received requests are processed at an instance of a web application, including handling private data related to storage coupled to the non-public server set. For example, non-public server set 116 of FIG. 1 processes requests 134 received from traffic manager 106, and such processing includes handling private data related to, for example, storage 122 of non-public server set 116. As discussed above, handling such private data may comprise, for example, writing private data to storage 122 that is included in a received request, writing private data to storage that is generated by web app second instance 120 based on the request (or is otherwise obtained in association with the request), reading private data from storage 122 used to process and/or respond to the request, etc.

In step 606, at least one performance criterion is monitored while processing the received requests to generate traffic telemetry. For example, traffic monitor 126 of non-public server set 116 may be configured to monitor at least one performance criterion of private web app servers 118 to generate traffic telemetry, which may be a measure of the performance of private web app servers 118 supporting web app second instance 120. As discussed above, as an on-premises cloud services platform, non-public server set 116 has finite resources, and traffic monitor 126 may be configured to generate traffic telemetry that reflects available compute, memory, storage, bandwidth, and/or other resource loads and/or performance conditions/parameters.

In step 608, traffic telemetry is transmitted to the traffic manager at the public-network-accessible server set. In an embodiment, the public-network-accessible server set may be public-network-accessible server set 104 of system 100 of FIG. 1, and traffic monitor 126 may transmit the traffic telemetry to traffic manager 106 in traffic telemetry signal 128 over any suitable communication link, wired and/or wireless. As discussed above, such traffic telemetry may be used by traffic manager 106 to determine whether to add or delete web application instances at public web app servers 108, and where to route requests 130 for handling by a web app instance.

Figure 7:
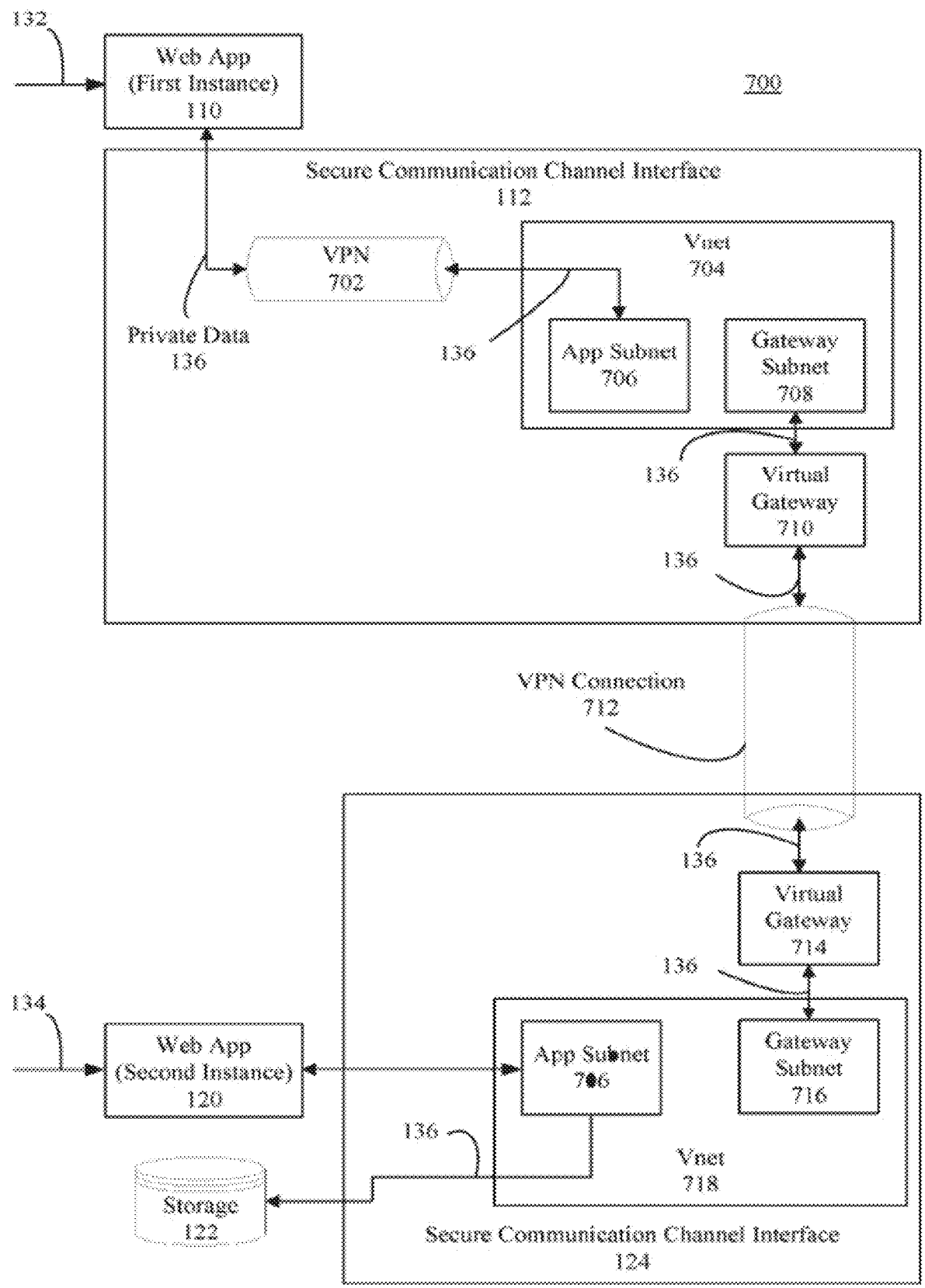
FIG. 7 shows a network topology for establishing secure communication between web application instances in public-network-accessible and non-public server sets, according to an example embodiment.

In embodiments, system 100 of FIG. 1 may be configured in any suitable manner to enable secure communications to be established between public-network-accessible server set 104 and non-public server set 116. For instance, FIG. 7 shows a network topology 700 for establishing secure communications between web application instances in public-network-accessible and non-public server sets, according to an example embodiment. Network topology 700 is an example embodiment for a portion of system 100 of FIG. 1. In particular, network topology 700 illustrates an example embodiment, for routing of data to and from storage 122 by first and second web app instances 110 and 120. Network topology 700 of FIG. 7 is described with reference to FIG. 1. However, other structural and operational embodiments will be apparent to persons skilled in the relevant art(s) based on the following discussion regarding network topology 700 and system 100 of FIG. 1.

Network topology 700 of FIG. 7 includes web app first instance 110, secure communication channel interface 112, a VPN (virtual private network) connection 712, secure communication channel interface 124, storage 122 and web app second instance 120. Secure communication channel interface 112 includes a VPN 702, a virtual network 704 that includes an app subnet 706 and a gateway subnet 708, and a virtual gateway 710. Secure communication channel interface 124 includes a virtual gateway 714 and a virtual network 718 that includes an app subnet 720 and a gateway subnet 716.

As shown in network topology 700 of FIG. 7, secure communication channel interfaces 112 and 124 are coupled through VPN connection 712, which is an example of secure channel 114 of FIG. 1. In an embodiment, VPN connection 712 may comprise a site-to-site communication protocol to ensure security for VPN negotiation and remote host or network access, such as the IPSEC/IKE (Internet Protocol Security/Internet Key Exchange) VPN standard protocol available on the Microsoft Azure® cloud computing platform. Of course, other types of secure connections may be established between secure communication channel interfaces 112 and 124 on further types of cloud computing platforms, as known to persons skilled in the relevant art(s).

In an embodiment, VPN connection 712 is associated with virtual gateways 710 and 714 at each end of the connection, and is included in secure communication channel interfaces 112 and 124, respectively. In an embodiment, each virtual gateway may comprise virtual machines deployed to their own gateway subnet such as gateway subnets 708 and 716, respectively. In an embodiment, the virtual machines associated with each virtual gateway may include routing tables and gateway services specific to the gateway, as may be known in the art.

Gateway subnets 708 and 716 as shown in FIG. 7 are subnetworks of virtual networks 704 and 718, respectively. Included in virtual networks 704 and 718 are application subnetworks 706 and 720, respectively. Application subnetworks 706 and 720 comprise the subnetwork address space for web apps 110 and 120. In an embodiment, virtual networks 704 and 718, as well as application subnetworks 706 and 720, may be configured such that web app 110 and web app 120 each appear to be executing in the same network context. In an embodiment, web app first instance 110 may connect to application subnet 706 via VPN connection 702. In an embodiment, VPN connection 702 may comprise a point-to-site VPN connection, such as one available on the Microsoft Azure® cloud computing platform, or other cloud computing platform.

Network topology 700 establishes a secure communication path between public-network-accessible server set 104 and non-public server set 116 of FIG. 1 that enables secure communication of private data 136 from web app first instance 110 running on public-network-accessible server set 104, to storage 122 for permanent storage. As illustrated in FIG. 7, private data 136 may flow through VPN connection 702 to virtual network 704, through virtual gateway 710, VPN connection 712, virtual gateway 714, virtual network 718 and finally onto storage 122 for persistent storage.

Embodiments of network topology 700 of FIG. 7 incorporated into system 100 of FIG. 1 may be configured such that web application instances 110 and 120 on both public-network-accessible server set 104 and non-public server set 116 appear to be on the same network allowing such instances to address external application resources (e.g., web page content) identically, and to access storage 122 as if both instances 110 and 120 were on the same subnetwork as storage 122. This may be desirable by presenting web application instances on each server set in an identical manner, right down to the underlying source code. This may usefully permit changes to the source code to be propagated simultaneously to both the private web app servers 118 and public web app servers 108 at the same time, without the need to customize the application depending on whether it is executing in the on-premises cloud, or in the off-premises cloud.

However, and in terms of the employee benefits web application discussed above, embodiments of non-public server set 116 may have more than sufficient resources for processing primary requests 134 during off-peak periods which may comprise most of the year (or other time period). Accordingly, in some embodiments, it may be desirable to forego simultaneous deployment of web app source code to both public-network-accessible server set 104 and non-public server set 116 in favor of asymmetric deployment. In an embodiment, asymmetric deployment may comprise asymmetric deployment of web app source code whereby updates to the web app source code are propagated only to non-public server set 116 when the only server set in use, and to collect source code updates for deployment to public web app server(s) 108 on a less frequent basis, and/or only at times when web app first instance 110 (and possibly further instances) are instantiated and actively handling requests. This may be appreciated because if web app first instance 110, or other instances of the web app, is/are not running, there is no need to establish a secure channel between public-network-accessible server set 104 and non-public server set 116. In such instances, substantial cost savings may be enjoyed by virtue of reduced consumption of cloud computing resources.

Note that foregoing general description of the operation of system 100 is provided for example, and embodiments of system 100 may operate in manners different than described above. Furthermore, not all steps of flowcharts 200, 300, 400, 500 and 600 need to be performed in all embodiments. Furthermore, the steps of flowcharts 200 and 600 may be performed in orders different than shown in some embodiments.

III. Example Computer System Implementation

Public-network-accessible server set 104, traffic manager 106, public web app servers 108, secure communication channel interface 112, non-public server set 116, traffic monitor 126, private web app servers 118, secure communication channel interface 124, storage 122, VPN 702, virtual network 704, virtual gateway 710, virtual gateway 714, virtual network 718, flowchart 200, flowchart 300, flowchart 400, flowchart 500, and/or flowchart 600 may be implemented in hardware, or hardware combined with software and/or firmware. For example, traffic manager 106, secure communication channel interface 112, traffic monitor 126, secure communication channel interface 124, VPN 702, virtual network 704, virtual gateway 710, virtual gateway 714, virtual network 718, flowchart 200, flowchart 300, flowchart 400, flowchart 500, and/or flowchart 600 may be implemented as computer program code/instructions configured to be executed in one or more processors and stored in a computer readable storage medium. Alternatively, traffic manager 106, secure communication channel interface 112, traffic monitor 126, secure communication channel interface 124, VPN 702, virtual network 704, virtual gateway 710, virtual gateway 714, virtual network 718, flowchart 200, flowchart 300, flowchart 400, flowchart 500, and/or flowchart 600 may be implemented as hardware logic/electrical circuitry.

For instance, in an embodiment, one or more, in any combination, of traffic manager 106, secure communication channel interface 112, traffic monitor 126, secure communication channel interface 124, VPN 702, virtual network 704, virtual gateway 710, virtual gateway 714, virtual network 718, flowchart 200, flowchart 300, flowchart 400, flowchart 500, and/or flowchart 600 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
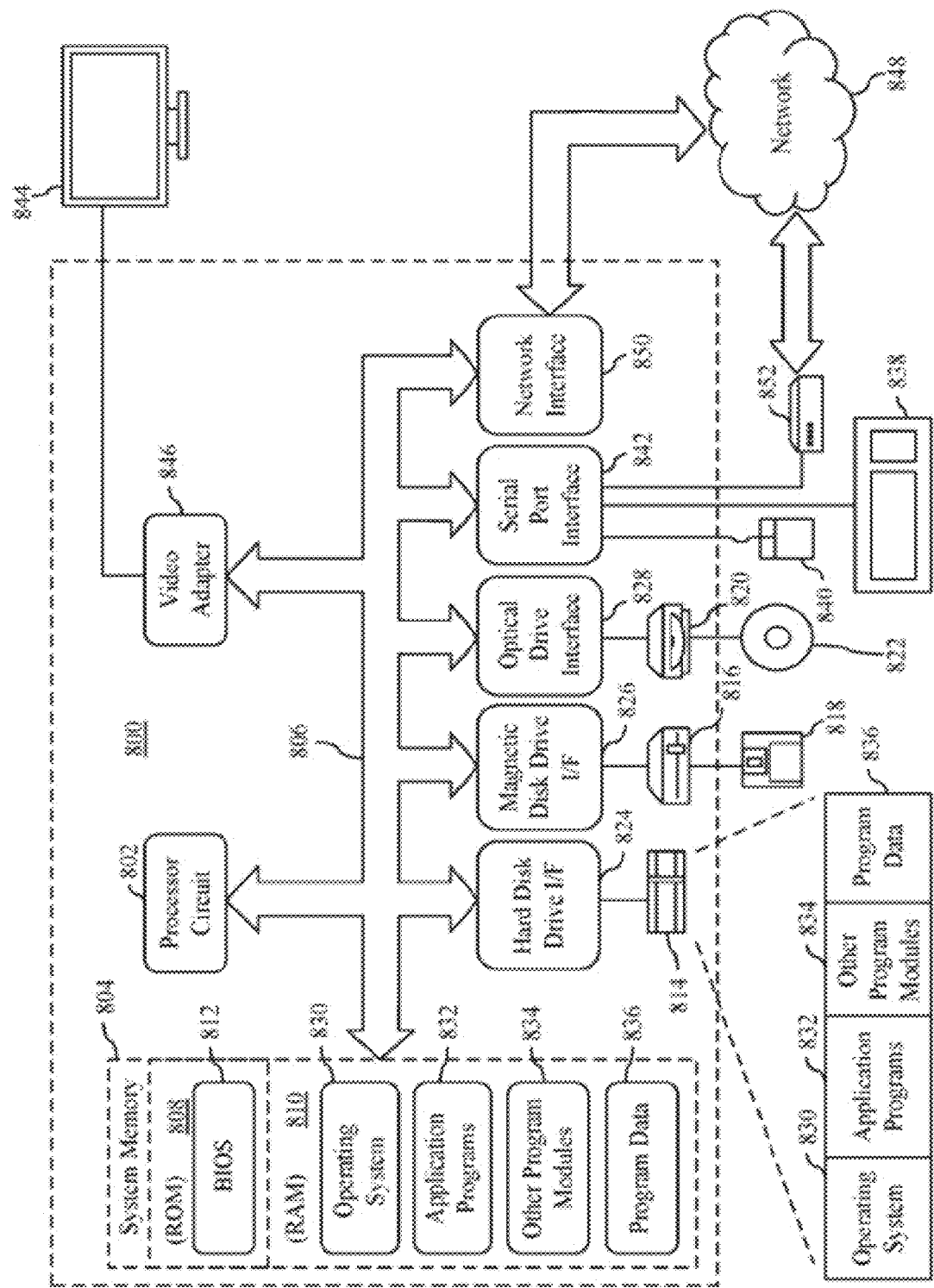
FIG. 8 is a block diagram of an example processor-based computer system that may be used to implement various embodiments.

FIG. 8 depicts an exemplary implementation of a computing device 800 in which embodiments may be implemented. For example, public-network-accessible server set 104, traffic manager 106, public web app servers 108, non-public server set 116, and/or private web app servers 118 may each be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing traffic manager 106, secure communication channel interface 112, traffic monitor 126, secure communication channel interface 124, VPN 702, virtual network 704, virtual gateway 710, virtual gateway 714, virtual network 718, flowchart 200, flowchart 300, flowchart 400, flowchart 500, and/or flowchart 600, and/or further embodiments described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments described herein. Accordingly, such computer programs represent controllers of the computing device 800.

Embodiments are also directed to computer program products comprising computer code or instructions stored on any computer-readable medium. Such computer program products include hard disk drives, optical disk drives,

IV. Additional Example Embodiments

In one embodiment, a system comprises: a public-network-accessible server set communicatively coupled to a non-public server set that includes a first instance of an application, the public-network-accessible server set configured to enable a second instance of the application to service requests received from computing devices over a public communication channel, the public-network-accessible server set comprising: a traffic manager configured to route each request of the requests, based at least on traffic telemetry received from the non-public server set, to the first instance of the application or to the second instance of the application, the second instance of the application configured to process the requests routed thereto to process data related to a storage associated with the non-public server set; and a secure communication channel interface configured to communicatively couple the public-network accessible server set to the non-public server set and permit secure transfer of the data therebetween.

In an embodiment, the traffic telemetry comprises at least one of: latency, bandwidth, or CPU utilization.

In an embodiment, the traffic manager is further configured to instantiate and execute the second instance of the application at the public-network-accessible server set based at least in part on the traffic telemetry.

In an embodiment, the traffic manager is further configured to automatically scale a number of instances of the application at the public-network-accessible server set based at least in part on the traffic telemetry.

In another implementation, the secure communication channel interface of the foregoing system is configured to couple the public-network-accessible server set and non-public server set through a virtual private network.

In an embodiment, the storage associated with the non-public server set stores data that cannot be stored in storage of the public-network-accessible server set due to sensitivity of the data.

In another embodiment, a computer-implemented method of managing data between a non-public server set includes a first instance of an application, and a public-network-accessible server set that includes a second instance of the application, the method comprising: receiving requests at the public-network-accessible server set from computing devices over a public communication channel; routing each request of the requests, based at least on traffic telemetry received from the non-public server set, to the first instance of the application or to the second instance of the application, the second instance of the application configured to process the requests routed thereto to process data related to a storage associated with the non-public server set; and transferring the data between the public-network-accessible server set and the non-public server set via a secure communication channel.

In an embodiment, the traffic telemetry comprises at least one of: latency, bandwidth and CPU utilization.

In an embodiment, the method further comprises: instantiating the second instance of the application at the public-network-accessible server set based at least in part on the traffic telemetry.

In an embodiment, the method further comprises: automatically scaling a number of instances of the application at the public-network-accessible server set based at least in part on the traffic telemetry.

In another implementation, the secure communication channel of the foregoing computer-implemented method comprises a virtual private network.

In an embodiment, the foregoing computer-implemented method further comprises maintaining the data as data in-use without saving the data to persistent storage while in the public-network-accessible server set.

In still another embodiment, a computer program product comprises a computer-readable memory device having computer program logic recorded thereon that when executed by at least one processor of a computing device causes the at least one processor to perform operations, the operations comprising: receiving requests at a public-network-accessible server set from computing devices over a public communication channel; routing each request of the requests, based at least on traffic telemetry received from a non-public server set, to a first instance of an application in the non-public server set or to a second instance of the application at the public-network-accessible server set, the second instance of the application configured to process the requests routed thereto to process data related to a storage associated with the non-public server set; and transferring the data between the public-network-accessible server set and the non-public server set via a secure communication channel.

In an embodiment, the operations further comprise maintaining the data as data in use and is not saved to persistent storage while in the public-network-accessible server set.

In still another embodiment, a system comprises: a non-public server set that includes a first instance of an application configured at least in part to receive private data, the non-public server set configured to be communicatively coupled to a public-network-accessible server set that includes a second instance of the application, the public-network accessible server set separate from the non-public server set, the public-network-accessible server set configured to securely couple to the non-public server set based on traffic telemetry generated at the non-public server set, and to determine based on the traffic telemetry to instantiate additional application instances; the first instance of the application configured to: receive requests routed to the first instance of the application by a traffic manager at the public-network-accessible server set, the public-network-accessible server set configured to receive the requests from computing devices over a public communication channel, the traffic manager configured to route each request of the requests, based on at least on the traffic telemetry, to the first instance of the application or to the second instance of the application, and process the requests routed to the first instance of the application, including processing additional private data related to storage of the non-public server set; the non-public server set further comprising: a traffic monitor configured to: monitor at least one performance criterion at the first instance of the application to generate the traffic telemetry; and transmit the traffic telemetry to the traffic manager at the public-network-accessible server set; and a communication channel interface configured to securely couple the non-public server set to the public-network accessible server set and enable secure transfer of the private data or the additional private data therebetween.

In an embodiment, the traffic telemetry comprises at least one of: latency, bandwidth and CPU utilization.

In an embodiment, the traffic manager is further configured to: instantiate and execute the second instance of the application at the public-network-accessible server set based at least in part on the traffic telemetry.

In an embodiment, the traffic manager is further configured to: automatically scale a number of instances of the application at the public-network-accessible server set based at least in part on the traffic telemetry.

In one embodiment, the communication channel interface of the foregoing system is configured to securely couple the public-network-accessible server set and non-public server set through a virtual private network.

In another embodiment, the private data and additional private data of the foregoing system are not saved to persistent storage while in the public-network-accessible server set.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

We claim:

1. A system, comprising:
a non-public-network-accessible server set to execute a first instance of an application, the non-public-network-accessible server set comprising:
a traffic monitor to generate traffic telemetry indicating demand on the non-public-network-accessible server set; and
a public-network-accessible server set to receive requests associated with the application from computing devices over one or more communication channels, the public-network-accessible server set comprising:
a traffic manager configured to:
receive traffic telemetry and a request;
based on demand indicated by the traffic telemetry, route the request to the first instance of the application on the non-public-network-accessible server; and
based on demand indicated by the traffic telemetry, instantiate a second instance of the application at the public-network-accessible server set, wherein the traffic manager is configured to automatically scale a number of instances of the application at the public-network-accessible server set based at least in part on the traffic telemetry.

2. The system of claim 1, wherein the public-network-accessible server set is communicatively coupled to the non-public-network-accessible server set via the one or more communication channels.

3. The system of claim 2, wherein the one or more communication channels comprises one or more public communication channels.

4. The system of claim 3, wherein the one or more communication channels further comprises one or more secure communication channels.

5. The system of claim 1, wherein the public-network-accessible server set, and all instances of the application instantiated at the public-network-accessible server set, are configured to not save data received from the non-public-network-accessible server set to persistent storage of the public-network-accessible server set.

6. The system of claim 1, wherein the first and second instances of the application belong to a same virtual network address space.

7. The system of claim 6, further comprising a storage of the non-public-network-accessible server set, the storage belonging to the same virtual network address space and communicatively coupled to the first and second instances of the application.

8. A method, comprising:
receiving traffic telemetry indicating demand on a non-public-network-accessible server set associated with execution of a first instance of an application by the non-public-network-accessible server set;
receiving requests associated with the application from computing devices over one or more communication channels; and
receiving traffic telemetry and a request via a traffic manager, wherein the traffic manager is configured to:
in response to determining that the demand indicated by the traffic telemetry fails to satisfy one or more predetermined thresholds, route the request to the first instance of the application on the non-public-network-accessible server; and
in response to determining that the demand indicated by the traffic telemetry satisfies the one or more predetermined thresholds, instantiate a second instance of the application at a public-network-accessible server set, wherein the traffic manager is configured to automatically scale a number of instances of the application at the public-network-accessible server set based at least in part on the traffic telemetry.

9. The method of claim 8, wherein the public-network-accessible server set is communicatively coupled to the non-public-network-accessible server set via the one or more communication channels.

10. The method of claim 9, wherein the one or more communication channels comprise one or more public communication channels or one or more secure communication channels.

11. The method of claim 8, wherein the traffic telemetry comprises at least one of latency, requests, errors, memory, storage, performance conditions, bandwidth, or central processing unit (CPU) utilization.

12. The method of claim 8, wherein the public-network-accessible server set, and all instances of the application instantiated at the public-network-accessible server set, are configured to not save data received from the non-public-network-accessible server set to persistent storage of the public-network-accessible server set.

13. The method of claim 8, wherein the first and second instances of the application belong to a same virtual network address space.

14. The method of claim 13, wherein a storage of the non-public-network-accessible server set belongs to the same virtual network address space and is communicatively coupled to the first and second instances of the application.

15. A computer program product comprising a computer-readable memory device having computer program logic recorded thereon that when executed by at least one processor of a computing device causes the at least one processor to perform operations, the operations comprising:
receiving traffic telemetry indicating load on a non-public-network-accessible server set associated with execution of a first instance of an application by the non-public-network-accessible server set;

receiving requests associated with the application from computing devices over one or more communication channels; and receiving traffic telemetry and a request via a traffic manager, wherein the traffic manager is configured to:
 in response to determining that the load indicated by the traffic telemetry fails to satisfy one or more predetermined thresholds, route the request to the first instance of the application on the non-public-network-accessible server; and
 in response to determining that the load indicated by the traffic telemetry satisfies the one or more predetermined thresholds, instantiate a second instance of the application at a public-network-accessible server set, wherein the traffic manager is configured to automatically scale a number of instances of the application at the public-network-accessible server set based at least in part on the traffic telemetry.

16. The computer program product of claim 15, wherein the public-network-accessible server set is communicatively coupled to the non-public-network-accessible server set via the one or more communication channels.

17. The computer program product of claim 16, wherein the one or more communication channels comprise one or more public communication channels or one or more secure communication channels.

18. The computer program product of claim 15, wherein the traffic telemetry comprises at least one of latency, requests, errors, memory, storage, performance conditions, bandwidth, or central processing unit (CPU) utilization.

19. The computer program product of claim 15, wherein the public-network-accessible server set, and all instances of the application instantiated at the public-network-accessible server set, are configured to not save data received from the non-public-network-accessible server set to persistent storage of the public-network-accessible server set.

20. The computer program product of claim 19, wherein the first and second instances of the application belong to a same virtual network address space.

\* \* \* \* \*